United States Patent Office 2,980,415
Patented Apr. 18, 1961

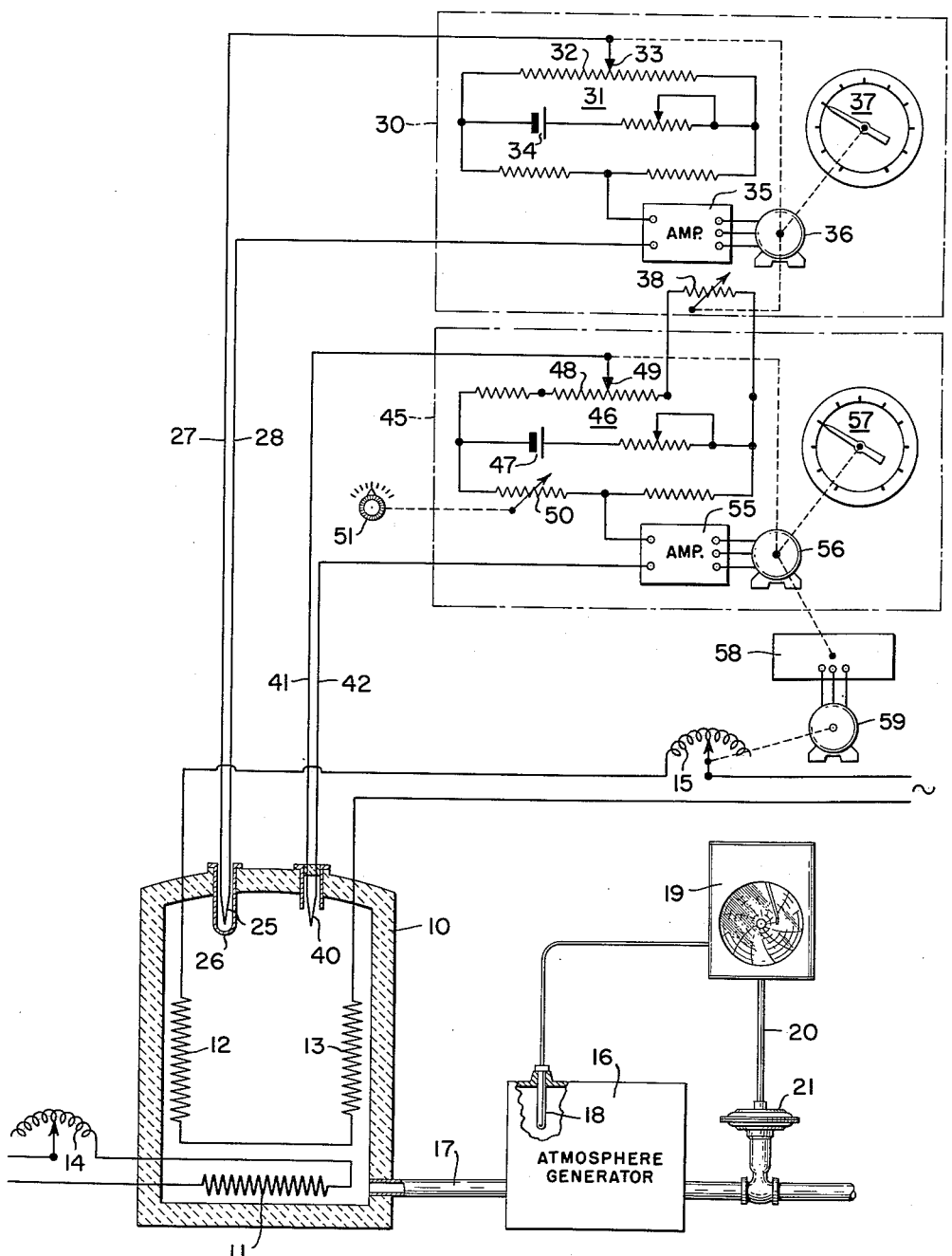

2,980,415
APPARATUS FOR CONTROLLING CASE HARDENING ACTION

Richard B. Beard, Philadelphia, Pa., assignor to Minneapolis-Honeywell Regulator Company, Minneapolis, Minn., a corporation of Delaware Filed Feb. 16, 1954, Ser. No. 410,521

5 Claims. (Cl. 266—5)

A general object of the present invention is to provide a new and improved controller for a heat treating furnace of the type used in case hardening metals. More specifically, the invention is concerned with controlling a heat treating furnace of the type used in heat treating or case hardening of metals wherein the controller therefor regulates the heat supplied to the furnace to regulate the heat treating or case hardening action.

Heat treating in a predetermined atmosphere has long been used to establish on the surface of certain metallic articles a hardened case. The ferrous metals are generally heat treated by means of carbon and the furnaces used in this particular instance are generally referred to as carburizing furnaces. In these furnaces, an atmosphere containing carbon as a constituent is of such a reactive nature that the carbon will combine with the iron on the surface of the article being heat treated by sorption of the gases which then react forming such compounds as ferric carbide which permits the carbon to diffuse into the metal. Whether or not carbon will go into or out of the metal will depend in part upon the carbon concentration in the metal itself and the carbon potential of the atmosphere of the furnace.

The concentration and depth of the carbon in the metal depends on many factors, the particularly important factors being the temperature of the metal, the temperature and type of atmosphere used, and the constituent potential of the particular element which is used in the hardening. The constituent potential of the atmosphere will vary the depth and the rate at which the case will form on the article being heat treated. In my copending application, entitled Control Apparatus, Serial No. 364,711, filed on June 29, 1953, now U.S. Patent No. 2,886,478, there is disclosed one method of regulating the heat treating action of the heat treating furnace by regulating the type of atmosphere that is fed to the furnace.

The apparatus of the present invention utilizes the principle that the heat treating action of a heat treating furnace may be closely controlled by regulating the heat input to the furnace while maintaining constant the constituent content of the atmosphere supplied to the furnace. The control of the heat input, when regulated by means sensing the desired heat treating action, permits very close control over the heat treating operation and greatly simplifies the overall control problem.

It is accordingly a more specific object of the present invention to provide a new and improved heat treating controller which regulates the heat treating action by regulating the heat supplied to the furnace.

Another more specific object of the present invention is to provide a control for a heat treating furnace which has a constant input atmosphere fed to the furnace wherein the heat treating action is regulated by controlling the heat supplied to the furnace.

Still another more specific object of the present invention is to provide a new and improved apparatus for regulating the heat treating action of a furnace by controlling the heat supplied to the furnace in accordance with a constituent potential of the atmosphere in the furnace.

A further more specific object of the present invention is to regulate the heat to a heat treating furnace where the furnace is supplied by a constant atmosphere generator by a controller which responds to the magnitude of a heat treating constituent of the atmosphere.

A still further object of the present invention is to provide a new and improved constituent potential measuring means which is compensated for temperature and is used to regulate the amount of heat supplied to a heat treating furnace.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described a preferred embodiment of the invention.

Referring now to the single figure, the numeral 10 represents a furnace which contains an atmosphere for heat treating objects positioned therein. The heat from the furnace 10 may be supplied by any desired means, such as the heaters 11, 12, and 13. As shown, the heater 11 acts as the primary heat supply unit for the furnace 10 and this heater has a suitable power regulator 14 connected in series with the feed lines thereto. This power regulating means may be manually or automatically controlled. The heaters 12 and 13 are connected in series and act as auxiliary heaters for the furnace 10, these heaters having the regulator 15 in series therewith for regulating the amount of power supplied to the heaters. Other heat supply means may obviously be used.

The atmosphere for the furnace 10 is supplied by way of a constant atmosphere generator 16 which feeds its output through a conduit 17 into the input of the furnace 10. For regulating this constant atmosphere generator, a hydrogen partial pressure sensing apparatus including a palladium tube 18 and a recording and control instrument 19 are used, the latter having an output connection 20 which supplies a control signal to a valve 21 on the input of the generator 16. The generator 16 and the control action accomplished by the sensing element 18 and controller 19 will be understood upon considering the above mentioned copending application.

The temperature within the furnace 10 is sensed by thermocouple 25 which is positioned within a fused quartz protective element 26. The output of the thermocouple is fed by way of leads 27 and 28 to the input of a suitable potentiometric measuring instrument 30. This instrument may well be of the type disclosed in the patent of Walter P. Wills, No. 2,423,540, issued July 8, 1947. This measuring apparatus includes a balanceable electrical network 31 which includes a slidewire resistor 32 and a movable slider 33. Power is supplied to the network 31 by means of a battery 34. As shown, the electrical potential from the thermocouple 25 is added in series with the voltage on the network 31 and is applied to the input of an amplifier 35 which is of the type which converts the input direct current signal into an alternating current signal of reversible phase and applies it to a reversible motor 36. This motor is effective to drive a suitable indicating and recording apparatus 37 as well as drive the slider 33 over the slidewire resistor 32 in a rebalancing direction. The rebalancing motor 36 is also used to variably adjust the magnitude of a resistor 38.

For determining the constituent potential of the atmosphere within the furnace 10, there is provided a further thermocouple 40 which is positioned to be directly exposed to the atmosphere within the furnace 10. This thermocouple 40 may be of the type shown in my copending application entitled, "Measuring Apparatus," Serial No. 389,418, filed on October 30, 1953, now U.S.

Patent No. 2,928,276. This thermocouple 40 will have an output voltage which varies both with temperature and with the constituent potential change within the furnace 10. If the constituent potential to be measured is carbon potential, the thermocouple 40 may well be formed with one element thereof comprising iron or a ferrous alloy which will sorb the carbon from the atmosphere. The sorption of the carbon will vary the thermoelectric output potential of the thermocouple in accordance with the magnitude of the constituent potential of the atmosphere. The potential on the output of the thermocouple is fed by way of leads 41 and 42 to a further potentiometric measuring apparatus 45, which may be of the same type as the apparatus 30. The apparatus 45 includes a potentiometric network 46 which receives its energizing voltage from a battery 47. The network includes a slidewire resistor 48 and an adjustable slider 49, the resistor 38 which is adjusted by the instrument 30, and a further set point adjusting resistor 50 which is adapted to be adjusted by the knob 51. The output of the network 46 and the thermocouple 40 added in series is applied to the input of an amplifier 55 which in turn converts the direct current input signal into an alternating current of reversible phase which may be used to drive the control motor 56. The motor 56 is adapted to drive the rebalancing slider 49 as well as the indicating mechanism 57. The output of the motor 56 may also be fed to a suitable controller 58.

The controller 58 may be of any suitable type used for causing proportional operation of an output control motor, such as the motor 59. The motor 59 is effective to reversibly drive the power regulator 15 which is in series with the heaters 12 and 13.

In considering the operation of the present apparatus, it should first be noted that the atmospheric generator 16 is supplying a constant atmosphere to the furnace 10 by way of conduit 17. For regulating the constancy of this atmosphere, the palladium tube 18 projects into the generator 16 and senses the partial pressure of the hydrogen in the atmosphere, the hydrogen being one of the prime control elements in determining the end product of the generator as it is fed to the furnace 10. The partial pressure of the hydrogen is fed from the palladium element 18 to the instrument 19 with the instrument in turn acting to regulate the input to the generator by means of the valve 21. Any suitable hydrogen sensing means may be used at this point in the control.

With a constant constituent atmosphere being fed to the furnace 10, the temperature of the furnace is set by adjusting the power regulator 14 which is in series with the heater 11. For a particular input atmosphere and for a desired carburizing action, the temperature may well be roughly set at approximately 1675° F. For this purpose, the indicator 37 of the potentiometric measuring device 30 may be used to observe the temperature within the furnace 10.

As pointed out above, the thermocouple 40 will sense the constituent potential of the atmosphere within the furnace 10 as well as the temperature within the furnace. The electrical potential variations of the thermocouple 40 due to temperature changes in the furnace are compensated for in the network 46 by the adjustment of the resistor 38 in accordance with the temperature variations in the furnace. In this manner, the motor 56 will be effective to provide a control signal which is indicative solely of the constituent potential of the atmosphere within the furnace. This will be indicated by the instrument 57. The motor 56 will also be used to adjust the controller 58 which in turn controls the operation of the motor 59 in adjusting the power regulator 15. For a particular carburizing action, the adjustable knob 51 will be set to a desired point with the adjustment being in terms of the carburizing or case hardening action desired. For a particular atmosphere and a particular type of metal, it is known that a desired carburizing action will take place at a particular temperature, such as 1700° F. Instead of controlling the temperature to 1700° F. by the temperature controller, it is desired that the heat supply of the furnace be adjusted until the carburizing action of the furnace is at the desired value. Inasmuch as the atmospheric conditions within the furnace will vary with different types of furnaces and with different materials therein, a straight temperature control will not provide the degree of control necessary to obtain the desired end product. For this reason, the carbon potential of the atmosphere is used to regulate the power supplied to the auxiliary heaters 12 and 13.

Should a different carburizing action be desired, it is but necessary to adjust the knob 51 to vary the carbon potential within the furnace 10 and this variation will result in a change in the heat supplied to the furnace 10 with a resultant change in the carburizing action of the atmosphere within the furnace. It will be readily apparent that the apparatus may be adapted to batch process control with means provided for adjusting the knob 51 in accordance with a timed cycle so as to permit the rapid formation of a hardened case on the metal within the furnace and then a subsequent removal of some of the material directly on the surface. The latter step in the case of carbon control is referred to as decarburization while in the case of a nitriding process, the removal would be referred to as denitriding.

From the foregoing it will be readily apparent that there has been provided an improved form of heat treating furnace controller which utilizes the constituent potential of the heat treating component of the furnace atmosphere for controlling the heat supplied to the furnace. The constituent potential sensing means may obviously take many forms including resistance elements or diffusion plates.

While, in accordance with the provisions of the statutes, there has been illustrated and described the best forms of the embodiments of the invention known, it will be apparent to those skilled in the art that changes may be made in the form of the apparatus disclosed without departing from the spirit of the invention as set forth in the appended claims and that in certain cases, certain features of the invention may be used to advantage without a corresponding use of other features.

Having now described my invention, what I claim as new and desire to secure by Letters Patent is:

1. A heat treating furnace controller comprising, in combination, hydrogen partial pressure sensing means arranged to control the atmosphere supplied to the furnace, and carbon potential sensing means connected to regulate the heat supplied to said furnace.

2. A controller for a heat treating furnace comprising, in combination, a furnace atmosphere constituent potential measuring means, furnace heat control means connected to be controlled by said measuring means, and furnace temperature responsive means connected to said measuring means to compensate said measuring means for changes in furnace temperature.

3. A controller for a heat treating furnace comprising, in combination, means for maintaining the atmosphere fed to the furnace effectively constant, furnace atmosphere carbon potential sensing means, a heat controller for the furnace, said controller including said carbon potential sensing means, and means including furnace temperature sensitive means connected to compensate said potential sensing means for temperature changes in said furnace.

4. A controller for a heat treating furnace comprising, in combination, a first potentiometer measuring apparatus having as an input a furnace temperature sensing element, a second potentiometric measuring apparatus having as an input a signal proportional to the magnitude of a constitutent potential of the atmosphere in said furnace, means including said first apparatus connected to said second apparatus to modify the measurement of said second apparatus in accordance with changes in temperature in the furnace, and means connecting said second apparatus to regulate the heat supplied to the furnace.

5. Apparatus as defined in claim 4 wherein the atmosphere supplied to the furnace is maintained constant in its constituents.

References Cited in the file of this patent

UNITED STATES PATENTS

| | | |
|---|---|---|
| 1,709,042 | Siebert | Apr. 16, 1929 |
| 2,541,857 | Besselman et al. | Feb. 13, 1951 |
| 2,752,147 | Besselman et al. | June 26, 1956 |